(12) United States Patent
Ansari et al.

(10) Patent No.: US 10,245,963 B2
(45) Date of Patent: Apr. 2, 2019

(54) AIR COOLED WIRELESS CHARGING PAD

(71) Applicant: Lear Corporation, Southfield, MI (US)

(72) Inventors: Ajmal Imran Ansari, Canton, MI (US); Richard J. Hampo, Plymouth, MI (US); David A. Hein, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 98 days.

(21) Appl. No.: 15/368,767

(22) Filed: Dec. 5, 2016

(65) Prior Publication Data

US 2018/0154781 A1   Jun. 7, 2018

(51) Int. Cl.

| | | |
|---|---|---|
| H02J 7/04 | (2006.01) | |
| B60L 11/18 | (2006.01) | |
| H02J 7/02 | (2016.01) | |
| B60L 3/00 | (2019.01) | |
| H01F 38/14 | (2006.01) | |
| H01F 27/02 | (2006.01) | |
| H01F 27/26 | (2006.01) | |

(52) U.S. Cl.
CPC ............ B60L 11/182 (2013.01); B60L 3/00 (2013.01); B60L 11/1824 (2013.01); H01F 27/02 (2013.01); H01F 38/14 (2013.01); H02J 7/025 (2013.01); *B60L 2230/10* (2013.01); *H01F 27/025* (2013.01); *H01F 27/26* (2013.01); *Y02T 10/7005* (2013.01); *Y02T 10/7088* (2013.01); *Y02T 90/12* (2013.01); *Y02T 90/121* (2013.01); *Y02T 90/122* (2013.01); *Y02T 90/14* (2013.01)

(58) Field of Classification Search
USPC ................................ 320/107, 108, 109, 162
See application file for complete search history.

(56) References Cited

U.S. PATENT DOCUMENTS

| | | | |
|---|---|---|---|
| 5,408,209 | A | 4/1995 | Tanzer et al. |
| 5,545,966 | A | 8/1996 | Ramos et al. |
| 5,917,307 | A | 6/1999 | Watanabe et al. |
| 6,175,212 | B1 | 1/2001 | Oguri |
| 6,384,703 | B1 | 5/2002 | Ramos et al. |
| 6,396,241 | B1 | 5/2002 | Ramos et al. |
| 8,723,366 | B2 | 5/2014 | Fiorello et al. |

(Continued)

FOREIGN PATENT DOCUMENTS

| | | |
|---|---|---|
| CN | 201898434 U | 7/2011 |
| CN | 201985749 U | 9/2011 |

(Continued)

OTHER PUBLICATIONS

United States Patent and Trademark Office, Non-Final Office Action for U.S. Appl. No. 15/159,930, dated Apr. 16, 2018.

(Continued)

*Primary Examiner* — Alexis B Pacheco
(74) *Attorney, Agent, or Firm* — Brooks Kushman P.C.

(57) ABSTRACT

A charging pad includes a housing, an interface layer, a magnetics assembly, and an electronics assembly. The housing has a magnetics assembly housing part and an electronics assembly housing part. The interface layer is within the housing. The magnetics assembly is arranged below the interface layer within the magnetics assembly housing part and the electronics assembly is arranged above the interface layer within the electronics assembly housing part.

15 Claims, 5 Drawing Sheets

(56) References Cited

U.S. PATENT DOCUMENTS

| | | | |
|---|---|---|---|
| 8,933,594 | B2 | 1/2015 | Kurs et al. |
| 8,947,186 | B2 | 2/2015 | Kurs et al. |
| 9,041,502 | B2 | 5/2015 | Ansari et al. |
| 9,071,061 | B2 | 6/2015 | Boys et al. |
| 9,076,593 | B2 | 7/2015 | Sharaf et al. |
| 9,787,138 | B2 | 10/2017 | Ichikawa |
| 9,854,709 | B2 | 12/2017 | Niizuma |
| 2008/0164844 | A1 | 7/2008 | Kato et al. |
| 2009/0096413 | A1* | 4/2009 | Partovi .................. H01F 5/003 320/108 |
| 2010/0109604 | A1 | 5/2010 | Boys et al. |
| 2011/0148351 | A1 | 6/2011 | Ichikawa |
| 2012/0319647 | A1* | 12/2012 | Itabashi ............ H02M 3/33553 320/108 |
| 2013/0038276 | A1 | 2/2013 | Raedy |
| 2013/0113423 | A1* | 5/2013 | Baarman ................ H01F 38/14 320/108 |
| 2013/0181797 | A1* | 7/2013 | Hickox ................. B60L 11/182 336/61 |
| 2013/0285463 | A1 | 10/2013 | Covic et al. |
| 2014/0111021 | A1 | 4/2014 | Nakamura |
| 2014/0111151 | A1 | 4/2014 | Keeling et al. |
| 2014/0232331 | A1* | 8/2014 | Stamenic ............. B60L 11/182 320/108 |
| 2014/0320090 | A1* | 10/2014 | Keeling .............. B60L 11/1829 320/162 |
| 2014/0327391 | A1* | 11/2014 | Niederhauser ........ B60L 11/182 320/108 |
| 2015/0091511 | A1* | 4/2015 | Ichikawa ................ H02J 17/00 320/108 |
| 2015/0102684 | A1* | 4/2015 | Tanaka .................... H02J 50/12 307/104 |
| 2015/0123465 | A1* | 5/2015 | Ichikawa ................ H02J 50/40 307/9.1 |
| 2015/0197155 | A1 | 7/2015 | Lu et al. |
| 2015/0334875 | A1 | 11/2015 | Topolewski et al. |
| 2015/0364924 | A1* | 12/2015 | Yuasa .................... H01F 27/02 307/104 |
| 2015/0367739 | A1* | 12/2015 | Boser ..................... H01F 38/14 320/108 |
| 2017/0274778 | A1 | 9/2017 | van Boheemen et al. |

FOREIGN PATENT DOCUMENTS

| | | |
|---|---|---|
| CN | 104956568 A | 9/2015 |
| JP | 2012244722 A | 12/2012 |
| WO | 2012031721 A2 | 3/2012 |

OTHER PUBLICATIONS

State Intellectual Property Office of People's Republic of China, First Office Action and translation for Chinese Patent Application No. 201710049789.3 dated Dec. 26, 2018.

United States Patent and Trademark Office, Final Office Action for U.S. Appl. No. 15/159,930, dated Oct. 18, 2018.

\* cited by examiner

AIR COOLED WIRELESS CHARGING PAD

TECHNICAL FIELD

The present invention relates to wireless charging pads.

BACKGROUND

A wireless charging pad receives power in free space (e.g., via a wireless electric-magnetic field) from a charging source. The charging pad is integral to a vehicle that uses power from the charging source.

SUMMARY

A charging pad includes a housing, an interface layer, a magnetics assembly, and an electronics assembly. The housing has a magnetics assembly housing part and an electronics assembly housing part. The interface layer is within the housing and has a top side and a bottom side. The magnetics assembly is arranged below the bottom side of the interface layer within the magnetics assembly housing part. The electronics assembly is arranged above the top side of the interface layer within the electronics assembly housing part.

The magnetics assembly is configured to wirelessly receive power from a charging source and the electronics assembly is configured to convert the power wirelessly received by the magnetics assembly into electrical power.

In an embodiment, the magnetics assembly housing part includes a floor portion spaced apart from the bottom side of the interface layer and the magnetics assembly is attached to the floor portion of the magnetics assembly housing part. In this case, the floor portion of the magnetics assembly housing part is a thermal path for the magnetics assembly as heat generated by the magnetics assembly thermally conducts through the floor portion of the magnetics assembly housing part into an external environment of the charging pad.

In an embodiment, the magnetics assembly includes an induction coil arrangement and ferrite tiles. The ferrite tiles are placed over coil windings of the induction coil arrangement. The floor portion of the magnetics assembly housing part includes tracks for receiving the coil windings of the induction coil arrangement.

In an embodiment, a potting material fills in space between components of the magnetics assembly and the floor portion of the magnetics assembly housing part. The potting material mechanically holds the components of the magnetics assembly, electrically isolates the components of the magnetics assembly, and thermally conducts heat generated by the components of the magnetics assembly to the floor portion of the magnetics assembly housing part.

In an embodiment, the electronics assembly housing part includes a ceiling portion spaced apart from the top side of the interface layer. The electronics assembly is attached to the ceiling portion of the electronics assembly housing part. In this case, the ceiling portion of the electronics assembly housing part is a thermal path for the electronics assembly as heat generated by the electronics assembly thermally conducts through the ceiling portion of the electronics assembly housing part into an external environment of the charging pad.

In an embodiment, the electronics assembly includes a printed circuit board having electric and electronic components arranged thereon and a thermal interface layer. The thermal interface layer is arranged between the printed circuit board and the ceiling portion of the electronics assembly housing part.

In an embodiment, the magnetics assembly housing part is of a thermally conductive plastic.

In an embodiment, the electronics assembly housing part is of at least one of thermally conductive plastic and metal.

In an embodiment, the interface layer includes a thermal insulator sub-layer and an electromagnetic shielding sub-layer. The thermal insulator sub-layer forms one of the top side and the bottom side of the interface layer and the electromagnetic shielding sub-layer forms an other one of the top side and bottom side of the interface layer.

A charging pad for an electric vehicle includes a magnetics assembly to wirelessly receive power from a charging source, an electronics assembly to convert the power wirelessly received by the magnetics assembly into electrical power for charging the electric vehicle, an interface layer separating the magnetics assembly and the electronics assembly, a magnetics assembly housing part having a floor portion spaced apart from the interface layer, and an electronics assembly housing part having a ceiling portion spaced apart from the interface layer. The magnetics assembly is arranged within the magnetics assembly housing part and is attached to the floor portion of the magnetics assembly housing part whereby heat generated by the magnetic assembly thermally conducts from the floor portion of the magnetics assembly housing part into an external environment. The electronics assembly is arranged within the electronics assembly housing part and is attached to the ceiling portion of the electronics assembly housing part whereby heat generated by the electronics assembly thermally conducts from the ceiling portion of the electronics assembly housing part into the external environment.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a receiving coil to achieve power transfer.

Herein, "electric vehicle" refers to any type of vehicle that uses electrical power from a traction battery of the vehicle for vehicle propulsion. A battery electric vehicle (BEV) is an electric vehicle that solely uses electrical power from a traction battery for propulsion. A hybrid electric vehicle (HEV) and a plug-in hybrid electric vehicle (PHEV) are electric vehicles which use mechanical power from an internal combustion engine and electrical power from a traction battery for propulsion. An electric vehicle is not limited to an automobile and may include motorcycles, carts, scooters, and the like. By way of example, a target device is described herein in the form of an electric vehicle. Other target devices that may be at least partially powered using a chargeable energy storage device (e.g., a battery) are also contemplated (e.g., electronic devices such as personal computing devices, mobile phones, tablet computers, and the like).

Figure 1:
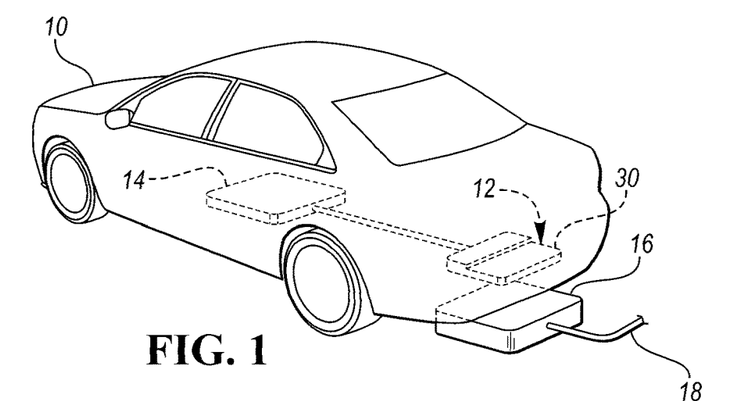
FIG. 1 illustrates a schematic diagram of an electric vehicle having a charging pad for wirelessly receiving power from a charging source for charging a traction battery of the vehicle.

Referring now to FIG. 1, a schematic diagram of an electric vehicle 10 having a charging pad 12 for wirelessly receiving power from a charging source for charging a traction battery 14 of the vehicle is shown. Charging pad 12 includes a magnetics assembly 22 (shown, for example, in FIG. 2A) (e.g., an induction coil arrangement) for wirelessly receiving power from the charging source. Charging pad 12 further includes an electronics assembly 24 (shown, for example, in FIG. 2A) (e.g., a printed circuit board (PCB) arrangement) for converting the power wirelessly received by magnetics assembly 22 into electrical power. Electrical power output from electronics assembly 24 is provided to traction battery 14 for charging the battery.

During the charging operation, vehicle 10 is parked in a position in which charging pad 12 faces a remotely located wireless charge unit 16 of the charging source. Wireless charge unit 16 generates power from electrical current received via a transmission line 18 from the charging source. The charging source is, for example, the electrical grid. Wireless charge unit 16 has an induction coil arrangement for wirelessly transferring the power. The induction coil arrangement of wireless charge unit 16 wirelessly transfers the power to magnetics assembly 22 of charging pad 12 during the charging operation. Magnetics assembly 22 interacts with the induction coil arrangement of wireless charge unit 16 via a region of the electromagnetic field generated by the induction coil arrangement of the wireless charge unit. In this regard, charging pad 12 and wireless charge unit 16 are arranged so that magnetics assembly 22 faces the induction coil arrangement of the wireless charge unit when the charging pad faces the wireless charge unit. For instance, in the situation shown in FIG. 1, magnetics assembly 22 is oriented to face downward from the body of vehicle 10 to face wireless charge unit 16 located on or under the floor beneath the vehicle body.

Figure 2A:
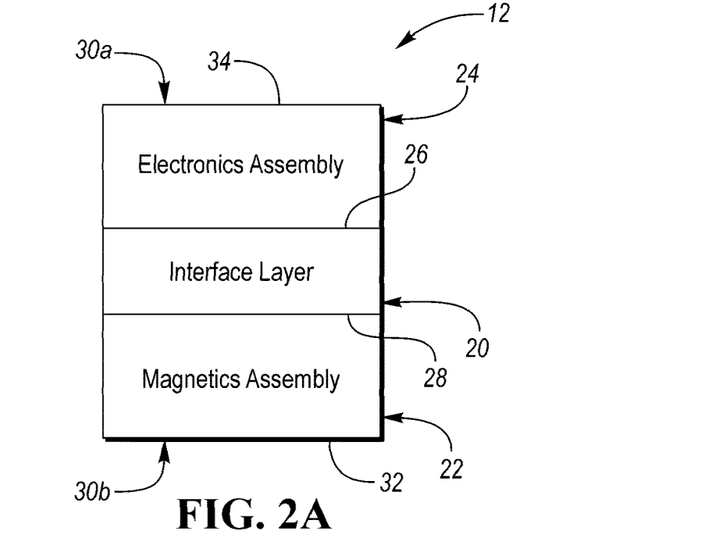
FIG. 2A illustrates a block diagram of the charging pad, the charging pad having an interface layer including top and bottom sides, an electronics assembly arranged above the top side of the interface layer, and a magnetics assembly arranged below the bottom side of the interface layer.

Referring now to FIG. 2A, with continual reference to FIG. 1, a block diagram of charging pad 12 is shown. Charging pad 12 includes an interface layer 20, magnetics assembly 22, and electronics assembly 24. Interface layer 20 is positioned between magnetics assembly 22 and electronics assembly 24. Magnetics assembly 22 includes the components of charging pad 12 for wirelessly receiving power from a charging source. Electronics assembly 24 includes the components of charging pad 12 for converting the power wirelessly received by magnetics assembly 22 into electrical power.

Charging pad 12 further includes a housing 30. Housing 30 includes an electronics assembly housing part 30a and a magnetics assembly housing part 30b. Housing parts 30a and 30b assemble together to form housing 30. Interface layer 20, magnetics assembly 22, and electronics assembly 24 are housed within housing 30. Housing parts 30a and 30b are both open-ended at the location of interface layer 20. Interface layer 20 thus acts as a side of each of housing parts 30a and 30b.

Interface layer 20 divides the area within housing 30 into respective compartments for magnetics assembly 22 and electronics assembly 24. Interface layer 20 has a top side 26 and a bottom side 28. Electronics assembly 24 is arranged above top side 26 of interface layer 20 within electronics assembly housing part 30a. Magnetics assembly 22 is arranged below bottom side 28 of interface layer 20 within magnetics assembly housing part 30b.

Figure 2B:
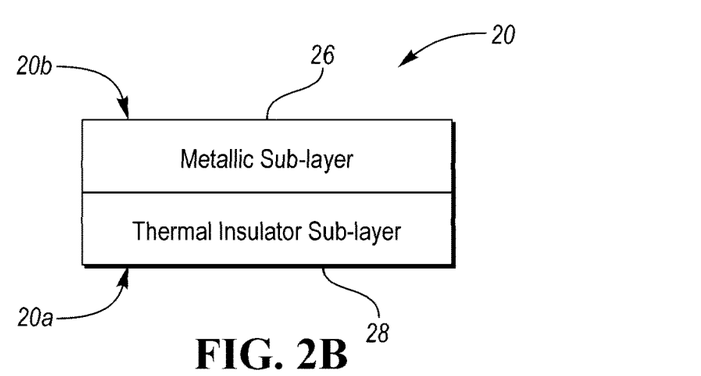
FIG. 2B illustrates a block diagram of the interface layer.

Referring now to FIG. 2B, with continual reference to FIGS. 1 and 2A, a block diagram of interface layer 20 is shown. Interface layer 20 functions as a thermal insulator and an electromagnetic isolator between magnetics assembly 22 and electronics assembly 24. Interface layer 20 includes a thermal insulator sub-layer 20a and a metallic sub-layer 20b. Sub-layers 20a and 20b stack on top of one another to form interface layer 20.

Thermal insulator sub-layer 20a acts as a thermal insulator or thermal barrier between magnetics assembly 22 and electronics assembly 24. Thermal insulator sub-layer 20a prevents heat exchange from magnetics assembly 22 into electronics assembly 24 and from the electronics assembly into the magnetics assembly. Thermal insulator sub-layer 20a may be composed of, for example, a foam material.

Metallic sub-layer 20b acts as an electromagnetic isolator between magnetics assembly 22 and electronics assembly 24. Metallic sub-layer 20b is an electromagnetic interference (EMI) shield which prevents the relatively intense electromagnetic fields from magnetics assembly 22 extending into electronics assembly 24. In this way, metallic sub-layer 20b prevents EMI of electronics assembly 24 by magnetics assembly 22. Metallic sub-layer 20b also prevents electromagnetic fields from electronics assembly 24 extending into magnetics assembly 22. Metallic sub-layer 20b may be composed of a metal such as, for example, aluminum.

In the arrangement shown in FIG. 2B, metallic sub-layer 20b forms top side 26 of interface layer 20 and thermal insulator sub-layer 20a forms bottom side 28 of the interface layer. The arrangement of the stacking of sub-layers 20a and 20b may be reversed from the arrangement shown in FIG. 2B such that thermal insulator sub-layer 20a forms top side 26 of interface layer 20 and metallic sub-layer 20b forms bottom side 28 of the interface layer. In other embodiments, interface layer 20 includes just one of thermal insulator sub-layer 20a and metallic sub-layer 20b. In this case, the single sub-layer 20a or 20b forms both of top side 26 and bottom side 28 of interface layer 20.

As noted with reference to FIG. 2A, electronics assembly 24 is arranged above top side 26 of interface layer 20 within electronics assembly housing part 30a and magnetics assembly 22 is arranged below bottom side 28 of the interface layer within magnetics assembly housing part 30b. In particular, with reference to FIG. 2A, electronics assembly 24 is arranged on an inner side of a ceiling portion 34 of electronics assembly housing part 30a. Similarly, magnetics assembly 22 is arranged on an inner side of a floor portion 32 of magnetics assembly housing part 30b.

Magnetics assembly housing part 30b is composed of a plastic, in particular, a thermally conductive plastic. The thermally conductive plastic body is non-magnetic and hence does not induce eddy current losses. Magnetics assembly housing part 30b is composed of a plastic so as to not impede wireless power transfer from the wireless charge unit to magnetics assembly 22. The plastic is thermally conductive so that magnetics assembly housing part 30b conducts heat generated by magnetics assembly 22 away from the magnetics assembly and into the external environment of charging pad 12. In particular, heat generated by magnetics assembly 22 thermally conducts through floor portion 32 of magnetics assembly housing part 30b into the external environment of charging pad. Thus, floor portion 32 of magnetics assembly housing part 30b is a thermal path for magnetics assembly 22.

Electronics assembly housing part 30a is composed of a metal or a thermally conductive plastic. In either case, electronics assembly housing part 30a conducts heat generated by electronics assembly 24 away from the electronics assembly and into the external environment of charging pad 12. In particular, heat generated by electronics assembly 24 thermally conducts through ceiling portion 34 of electronics assembly housing part 30a into the external environment of charging pad. Thus, ceiling portion 34 of electronics assembly housing part 30a is a thermal path for electronics assembly 24.

As indicated above, magnetics assembly 22 faces an external wireless charge unit to wirelessly receive power from an induction coil arrangement of the wireless charge unit. The wireless charge unit may be located at, above, or below the ground level. Charging pad 12, when attached to a vehicle body, is oriented so that magnetics assembly 22 faces downward from the vehicle body to face the wireless charge unit. As such, magnetics assembly 22 is located at the "bottom" of charging pad 12, electronics assembly 24 is located at the "top" of the charging pad, and interface layer 20 is intermediately located between the magnetics assembly and the electronics assembly. In this way, top side 26 of interface layer 20 is the "top" side of the interface layer and bottom side 28 of the interface layer is the "bottom" side of the interface layer. Likewise, floor portion 32 of magnetics assembly housing part 22 is the bottom most portion of charging pad whereas ceiling portion 34 of electronics assembly housing part 24 is the top most portion of the charging pad. The block diagrams of FIGS. 2A and 2B are illustrated in accordance with this arrangement of "top" and "bottom."

Magnetics assembly 22 generates heat as a result of wirelessly receiving power from the wireless charge unit. Electronics assembly 24 converts AC power received by magnetics assembly 22 into DC electrical power. Electronics assembly 24 generates heat as a result of its operation in converting the AC power received from magnetics assembly 22 into DC electrical power. The heat generated by magnetics assembly 22 and electronics assembly 24 is to be dissipated for charging pad 12 to function properly.

As described, magnetics assembly 22 is arranged on the inner side of floor portion 32 of magnetics assembly housing part 30b. Floor portion 32 of magnetics assembly housing part 30b is a thermal path to dissipate heat generated by magnetics assembly 22 into the external environment of charging pad 12. Electronics assembly 24 is arranged on the inner side of ceiling portion 34 of electronics assembly housing part 30a. Ceiling portion 34 of electronics assembly housing part 30a is a thermal path to dissipate heat generated by electronics assembly 24 into the external environment of the charging pad. Interface layer 20 (in particular, thermal insulator sub-layer 20b) blocks heat transfer from both of magnetics assembly 22 and electronics assembly 24 at the location of the interface layer.

In order to improve thermal contact between magnetics assembly 22 and floor portion 32 of magnetics assembly housing part 30b and/or between electronics assembly 24 and ceiling portion 34 of electronics assembly housing part 30a, use may be made of thermal interface materials to fill small air voids and gaps inherent to solid-to-sold contact. As described in greater detail below, potting material is used to improve thermal contact between magnetics assembly 22 and floor portion 32 of magnetics assembly housing part 30b.

Figure 3A:
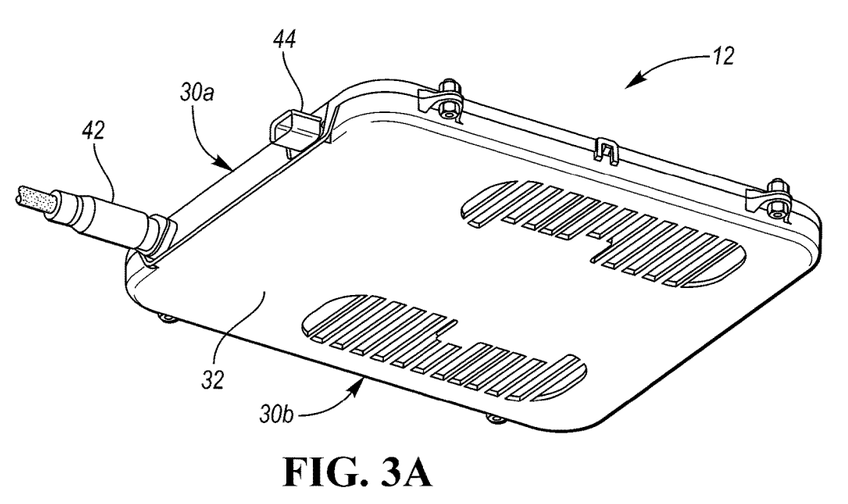
FIG. 3A illustrates an isometric view of the charging pad from an outer side of a floor portion of a magnetics assembly housing part of the charging pad for the magnetics assembly.
Figure 3B:
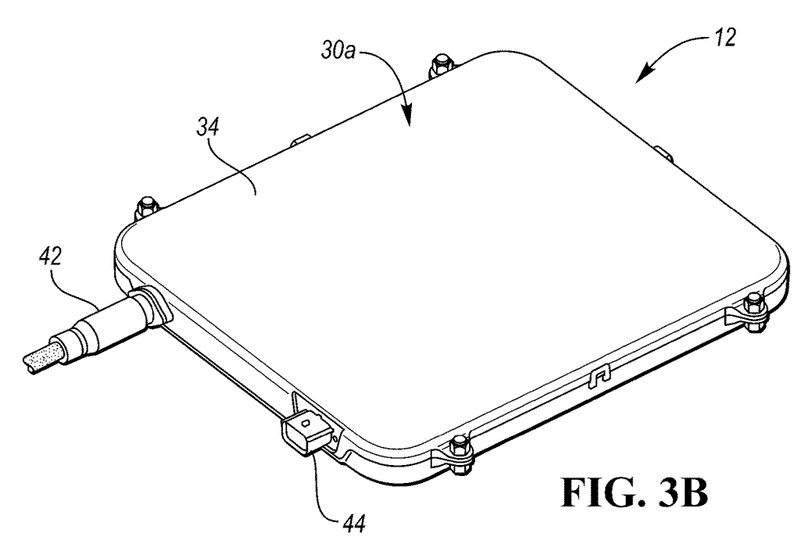
FIG. 3B illustrates an isometric view of the charging pad from an outer side of a ceiling portion of an electronics assembly housing part of the charging pad for the electronics assembly.
Figure 3C:
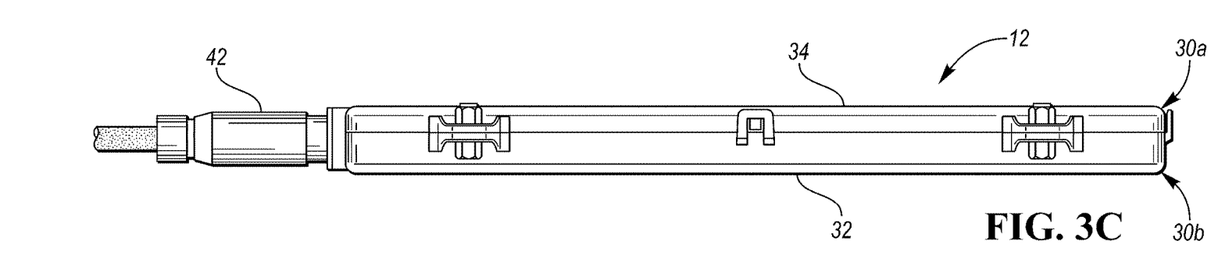
FIG. 3C illustrates a side view of the charging pad.
Figure 3D:
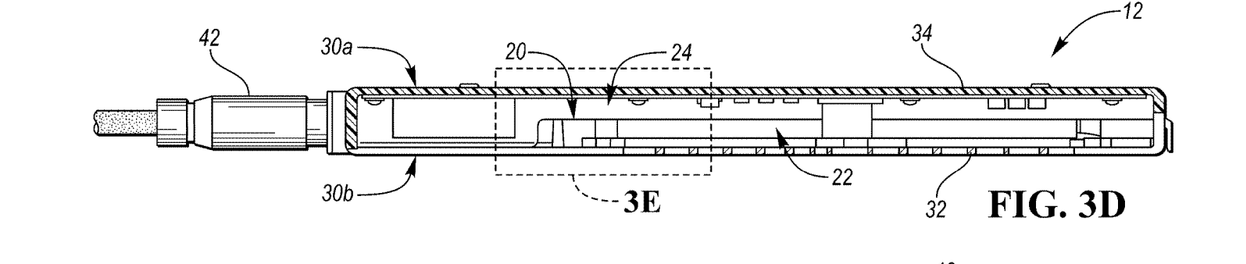
FIG. 3D illustrates a sectional side view of the charging pad.
Figure 3E:
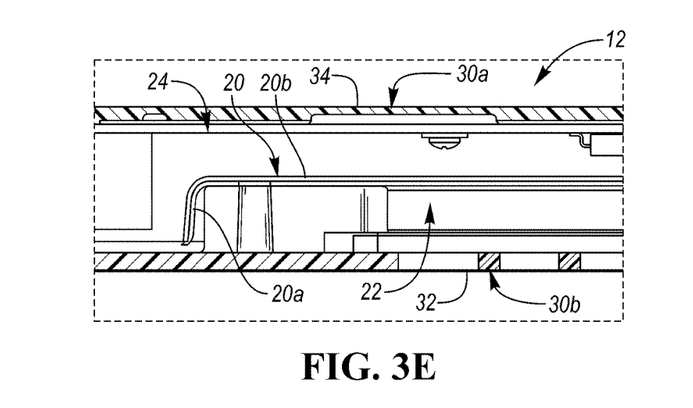
FIG. 3E illustrates an enlarged view of a portion of the sectional side view of the charging pad shown in FIG. 3D.

Referring now to FIGS. 3A, 3B, 3C, 3D, and 33, with continual reference to FIGS. 2A and 2B, charging pad 12 will be described in further detail. FIG. 3A illustrates an isometric view of charging pad 12 from an outer side of floor portion 32 of magnetics assembly housing part 30b. Magnetics assembly 22 is arranged on the inner side of floor portion 32 of magnetics assembly housing part 30b. FIG. 3B illustrates an isometric view of charging pad 12 from an outer side of ceiling portion 34 of electronics assembly housing part 30a. Electronics assembly 24 is arranged on the inner side of ceiling portion 34 of electronics assembly housing part 30a. FIG. 3C illustrates a side view of charging pad 12; FIG. 3D illustrates a sectional side view of the charging pad; and FIG. 3E illustrates an enlarged view of a portion of the sectional side view of the charging pad shown in FIG. 3D.

Floor portion 32 of magnetics assembly housing part 30b is shown in FIG. 3A. Floor portion 32 of magnetics assembly housing part 30b is a thermal path to dissipate heat generated by magnetics assembly 22 into the external environment of charging pad 12. In this way, heat generated by magnetics assembly 22 may radiate and convect away from the magnetics assembly through magnetics assembly housing part 30b. As shown in FIG. 3A, floor portion 32 of magnetics assembly housing part 30b includes thermal fins for improving heat flow from magnetics assembly 22 into the environment external to charging pad 12.

Ceiling portion 34 of electronics assembly housing part 30a is shown in FIG. 3B. Ceiling portion 34 of electronics assembly housing part 30a is a thermal path to dissipate heat generated by electronics assembly 24 into the external environment of charging pad 12. In this way, heat generated by electronics assembly 24 may radiate and convect away from the electronics assembly through electronics assembly housing part 30a.

As shown in shown in FIGS. 3A and 3B, charging pad 12 includes an electric output port 42 and a control port 44. Electric outlet port 42 and control port 44 extend out through electronics assembly housing part 30a. Electric outlet port 42 outputs the electrical power (e.g., DC electrical power) generated by electronics assembly 24. Control port 44 communicates input and output control/data signals and the like to and from magnetics assembly 22 and electronics assembly 24 in regards to the operation of the magnetics and electronics assemblies.

Figure 4A:
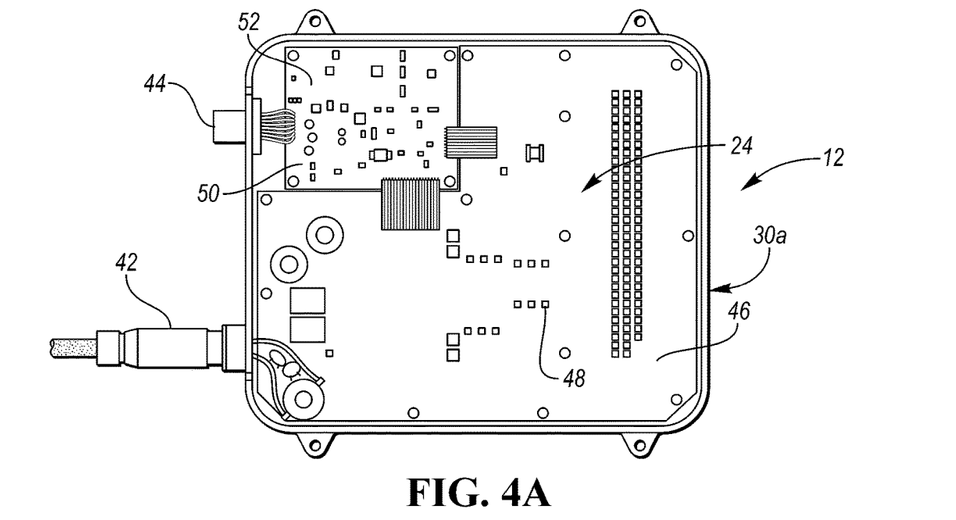
FIG. 4A illustrates a perspective view of the electronics assembly and the electronics assembly housing part, the electronics assembly arranged on an inner side of the ceiling portion of the electronics assembly housing part.
Figure 4B:
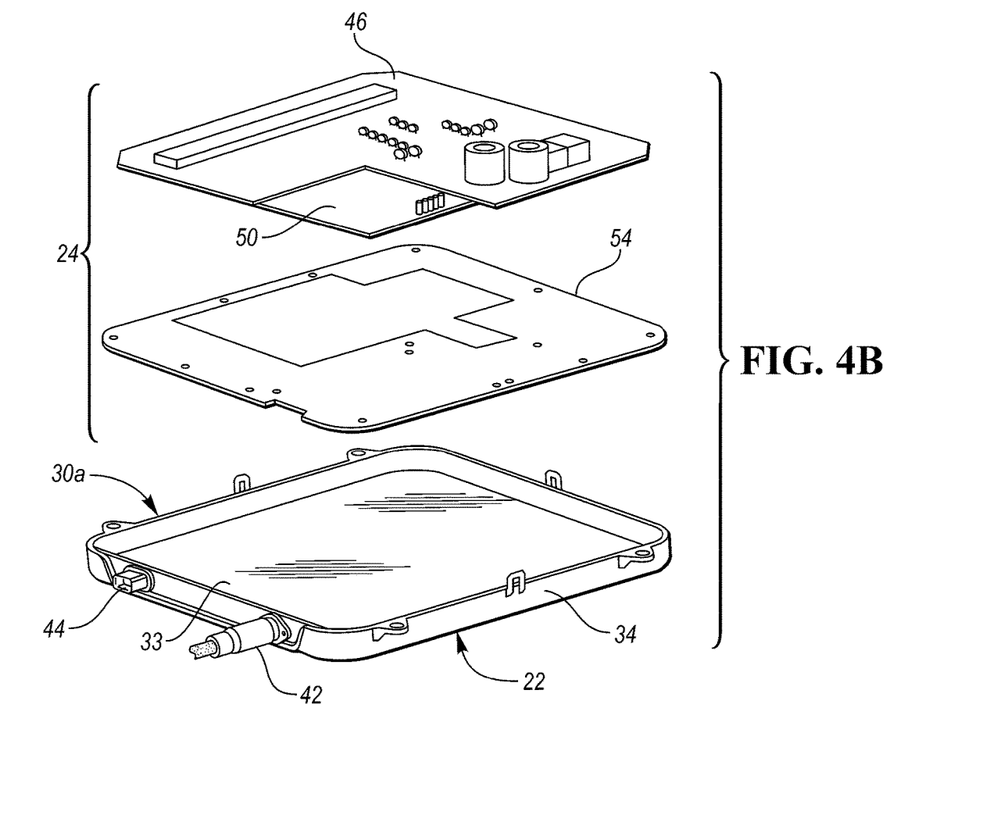
FIG. 4B illustrates an exploded view of the electronics assembly apart from the inner side of the ceiling portion of the electronics assembly housing part.

Referring now to FIGS. 4A and 4b, with continual reference to FIGS. 2A, 3D, and 3E, electronics assembly 24 will be described in further detail. FIG. 4A illustrates a perspective view of electronics assembly 24 and electronics assembly housing part 30a. As shown in FIG. 4A, electronics assembly 24 is arranged on an inner side 33 of ceiling portion 34 of electronics assembly housing part 30a. FIG. 4B illustrates an exploded view of electronics assembly 24 apart from the inner side of ceiling portion 34 of electronics assembly housing part 30a.

As shown in FIGS. 4A and 4B, electronics assembly 24 includes a printed circuit board (PCB) 46 having electric components 48 and a control board 50 having a control circuit assembly 52 arranged thereon. Electric components 48 (e.g., diodes, MOSFET switches, inductors, etc.) function to convert the AC power wirelessly received from magnetics assembly 22 into DC electrical power. This electrical power may be conveyed through electric outlet port 42 to a battery for charging the battery. Control circuit assembly 52 is configured to control the operation of electronic components 48 pursuant to control signals provided to the control circuit assembly through control port 44.

Electronics assembly 24 further includes a thermal interface material layer 54. Thermal interface material layer 54 is arranged between (i) PCB 46 and control board 50 and (ii) the inner side of ceiling portion 34 of electronics assembly housing part 30a. Thermal interface material layer 54 functions to absorb heat from electric components 48 and distribute the heat across the area of the thermal interface material layer for distribution to (aluminum) ceiling portion 34 of electronics assembly housing part 30a. The heat conducts through ceiling portion 34 of electronics assembly housing part 30a into the external environment of charging pad 12. A purpose of thermal interface material layer 54 is to reduce thermal contact resistance between (i) PCB 46 and control board 50 and (ii) ceiling portion 34 of electronics assembly housing part 30a. In case ceiling portion 34 of electronics assembly housing part 30a is made of metallic material, such as aluminum, thermal interface material layer 54 also provides an electrical isolation barrier between PCB 46 and the ceiling portion of the electronics assembly housing part and between control board 50 and the ceiling portion of the electronics assembly housing part. Thermal interface material layer 54 may be a liquid, gel, etc.

Figure 5A:
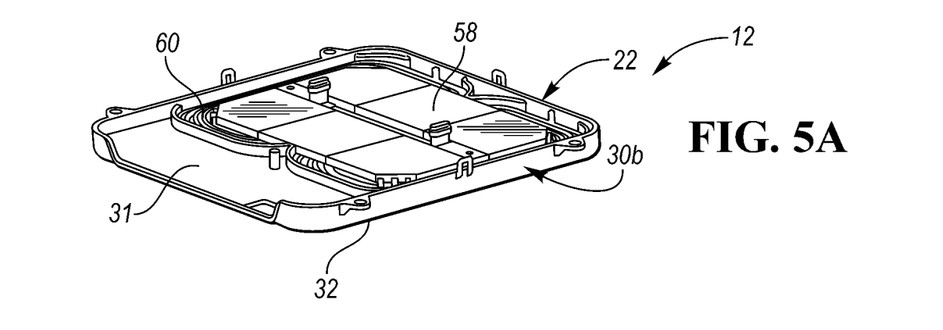
FIG. 5A illustrates a perspective view of the magnetics assembly and the magnetics assembly housing part, the magnetics assembly arranged on an inner side of the floor portion of the magnetics assembly housing part.
Figure 5B:
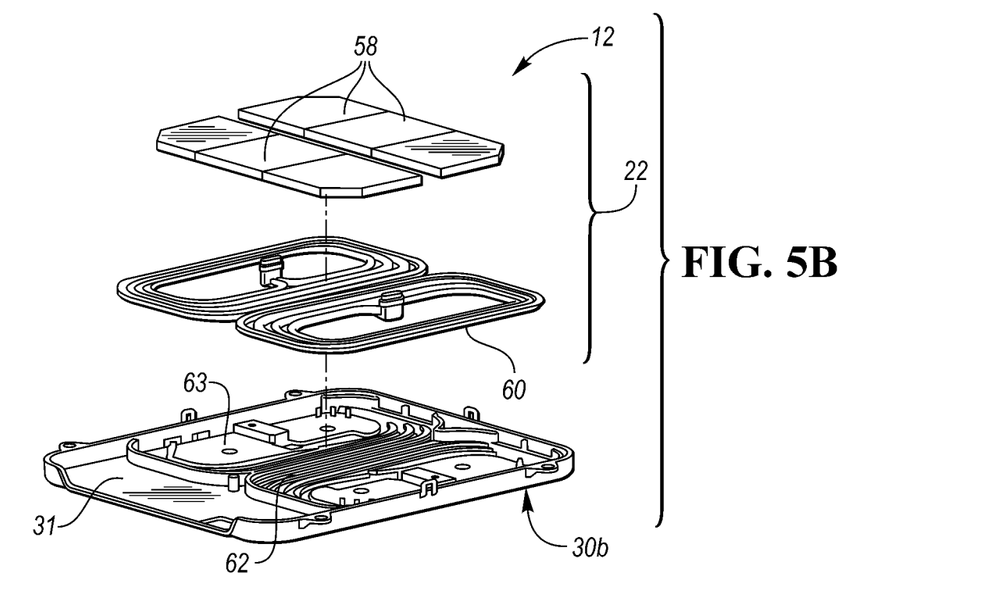
FIG. 5B illustrates an exploded view of the magnetics assembly apart from the inner side of the floor portion of the magnetics assembly housing part.
Figure 5C:
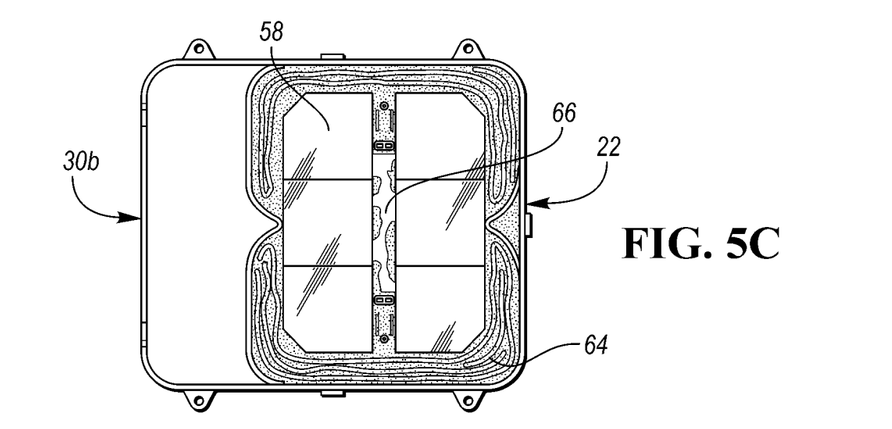
FIG. 5C illustrates a top view of the magnetics assembly with potting material arranged therein.

Referring now to FIGS. 5A, 5B, and 5C, with continual reference to FIGS. 2A, 3D, and 3E, magnetics assembly 22 will be described in further detail. FIG. 5A illustrates a perspective view of magnetics assembly 22 and magnetics assembly housing part 30b. As shown in FIG. 5A, magnetics assembly 22 is arranged on an inner side 31 of floor portion 32 of magnetics assembly housing part 30b. FIG. 5B illustrates an exploded view of magnetics assembly 22 apart from the inner side of floor portion 32 of magnetics assembly housing part 30b. FIG. 5C illustrates a top view of magnetics assembly 22 with potting material 64 arranged therein.

With reference to FIGS. 5A and 5B, magnetics assembly 22 includes one or more ferrite tiles 58 and an induction coil arrangement 60. Induction coil arrangement 60 includes a coil winding wound in loops. Ferrite tiles 58 are placed over a portion of the coil winding of induction coil arrangement 60.

As described, floor portion 32 of magnetics assembly housing part 30b is made of plastic and magnetics assembly 22 is supported on inner side 31 of floor portion 32 of magnetics assembly housing part 30b. Inner side 31 of floor portion 32 of magnetics assembly housing part 30b includes a plurality of tracks 62 for receiving the coil winding of induction coil arrangement 60 therein. Tracks 62 extend in a step-like fashion away from inner side 31 of floor portion 32 of magnetics assembly housing part 30b. Accordingly, coil turns of the coil winding of induction coil arrangement 60 placed within tracks 62 also extend in a step-like fashion away from inner side 31 of floor portion 32 of magnetics assembly housing part 30b. Inner side 31 of floor portion 32 of magnetics assembly housing part 30b also includes features 63 for holding ferrite tiles 58 in place.

With reference to FIG. 5C, magnetics assembly 22 further includes potting material 64. Potting material 64 is thermally conductive. Potting material 64 fills in the empty space between (i) ferrite tiles 58 and induction coil arrangement 60 and (ii) inner side 31 of floor portion 32 of magnetics assembly housing part 30b. Potting material 64 eliminates any air gaps between i) ferrite tiles 58 and induction coil arrangement 60 and (ii) inner side 31 of floor portion 32 of magnetics assembly housing part 30b. Potting material 64 thereby reduces thermal resistance between magnetics assembly 22 (i.e., ferrite tiles 58 and induction coil arrangement 60) with floor portion 32 of magnetics assembly housing part 30b. In this way, potting material 64 enhances heat transfer from ferrite tiles 58 and induction coil arrangement 60 to floor portion 32 of magnetics assembly housing part 30b. As described, this heat generated by ferrite tiles 58 and induction coil arrangement 60 thermally conducts through floor portion 32 of magnetics assembly housing part 30b into the external environment of charging pad.

As shown in FIG. 5C, potting material 64 is further deposited over and between the coil winding turns of induction coil arrangement 60 left exposed by ferrite tiles 58. Potting material 64 further fills the space between the coil winding turns of induction coil arrangement 60 and the outer edges of ferrite tiles 58. Potting material 64 functions as an adhesive to mechanically hold the coil winding turns of induction coil arrangement 60 and ferrite tiles 58 in place.

Potting material 64 also acts as an electrical insulator between the coil winding turns individually and between the coil winding turns and ferrite tiles 58. The coil winding turns have a relatively high voltage level. Potting material 64 thus provides electrical isolation between voltages induced in adjacent coil winding turns. Potting material 64 thus prevents electrical shorting of adjacent coil winding turns. Potting material 64 also electrically isolates ferrite tiles 58 from the coil winding turns.

In sum, potting material 64 functions as: (1) an adhesive to mechanically hold ferrite tiles 58 and induction coil arrangement 60 in place; (2) an electrical isolator to electrically isolate the coil winding turns induction coil arrangement 60 from one another and from ferrite tiles 58; and (3)

a thermal conductor to reduce thermal contact resistance between the components of magnetic assembly 22 and floor portion 32 of magnetics assembly housing part 30*b*. Potting material 64 may be any material known in the art suitable for any such purposes, (for example, a filled epoxy or filled silicone).

Potting material can also be used on electronics assembly 24 for providing better electrical isolation of high voltage components, preventing moisture ingress, and reducing creepage and clearance distance requirements.

As further shown in FIG. 5C, magnetics assembly 22 may further include a ferrite plastic sheet 66. Ferrite plastic sheet 66 is placed between ferrite tiles 58 and induction coil arrangement 60. Ferrite plastic sheet 66 is stacked underneath ferrite tiles 58 to prevent edges of ferrite tiles 58 from scraping and damaging the coil winding turns of induction coil arrangement 60.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A charging pad comprising:
a housing having a magnetics assembly housing part and an electronics assembly housing part;
an interface layer within the housing, the interface layer having a top side and a bottom side, wherein the interface layer includes a thermal insulator sub-layer and an electromagnetic shielding sub-layer, the thermal insulator sub-layer forms one of the top side and the bottom side of the interface layer and the electromagnetic shielding sub-layer forms an other one of the top side and bottom side of the interface layer;
wherein the magnetics assembly housing part includes a floor portion spaced apart from the bottom side of the interface layer;
wherein the electronics assembly housing part includes a ceiling portion spaced apart from the top side of the interface layer;
a magnetics assembly arranged below the bottom side of the interface layer within the magnetics assembly housing part and attached to the floor portion of the magnetics assembly housing part; and
an electronics assembly spaced apart from and arranged above the top side of the interface layer within the electronics assembly housing part and attached to the ceiling portion of the electronics assembly housing part, the electronics assembly including a printed circuit board having electric and electronic components arranged thereon, the printed circuit board being attached to the ceiling portion of the electronics assembly housing part.

2. The charging pad of claim 1 wherein:
the floor portion of the magnetics assembly housing part is a thermal path for the magnetics assembly as heat generated by the magnetics assembly thermally conducts through the floor portion of the magnetics assembly housing part into an external environment of the charging pad.

3. The charging pad of claim 1 wherein:
the magnetics assembly includes an induction coil arrangement and ferrite tiles, the ferrite tiles placed over coil windings of the induction coil arrangement; and
the floor portion of the magnetics assembly housing part includes tracks for receiving the coil windings of the induction coil arrangement, wherein the tracks extend in a step-like fashion away from the floor portion of the magnetics assembly housing part.

4. The charging pad of claim 1 further comprising:
a potting material filling in space between components of the magnetics assembly and the floor portion of the magnetics assembly housing part, the potting material mechanically holding the components of the magnetics assembly, electrically isolating the components of the magnetics assembly, and thermally conducting heat generated by the components of the magnetics assembly to the floor portion of the magnetics assembly housing part.

5. The charging pad of claim 1 wherein:
the ceiling portion of the electronics assembly housing part is a thermal path for the electronics assembly as heat generated by the electronics assembly thermally conducts through the ceiling portion of the electronics assembly housing part into an external environment of the charging pad.

6. The charging pad of claim 1 wherein:
the electronics assembly further includes a thermal interface layer, the thermal interface layer being arranged between the printed circuit board and the ceiling portion of the electronics assembly housing part.

7. The charging pad of claim 1 wherein:
the magnetics assembly housing part is of a thermally conductive plastic.

8. The charging pad of claim 7 wherein:
the electronics assembly housing part is of at least one of thermally conductive plastic and metal.

9. The charging pad of claim 1 wherein:
the magnetics assembly is configured to wirelessly receive power from a charging source and the electronics assembly is configured to convert the power wirelessly received by the magnetics assembly into electrical power.

10. A charging pad for an electric vehicle, comprising:
a magnetics assembly to wirelessly receive power from a charging source;
an electronics assembly to convert the power wirelessly received by the magnetics assembly into electrical power for charging the electric vehicle;
an interface layer separating the magnetics assembly and the electronics assembly, the interface layer includes a thermal insulator sub-layer and an electromagnetic shielding sub-layer;
a magnetics assembly housing part having a floor portion spaced apart from the interface layer;
an electronics assembly housing part having a ceiling portion spaced apart from the interface layer;
wherein the magnetics assembly is arranged below the bottom side of the interface layer within the magnetics assembly housing part and is attached to the floor portion of the magnetics assembly housing part whereby heat generated by the magnetic assembly thermally conducts from the floor portion of the magnetics assembly housing part into an external environment; and
wherein the electronics assembly is spaced apart from and arranged above the top side of the interface layer within the electronics assembly housing part and is attached to the ceiling portion of the electronics assembly housing part whereby heat generated by the electronics assembly thermally conducts from the ceiling portion of the electronics assembly housing part into the external environment, the electronics assembly including a printed circuit board having electric and electronic components arranged thereon, the printed circuit board being attached to the ceiling portion of the electronics assembly housing part.

11. The charging pad of claim 10 wherein:
the magnetics assembly includes an induction coil arrangement and ferrite tiles, the ferrite tiles placed over coil windings of the induction coil arrangement; and
the floor portion of the magnetics assembly housing part includes tracks for receiving the coil windings of the induction coil arrangement.

12. The charging pad of claim 10 further comprising:
a potting material filling in space between components of the magnetics assembly and the floor portion of the magnetics assembly housing part, the potting material mechanically holding the components of the magnetics assembly, electrically isolating the components of the magnetics assembly, and thermally conducting heat generated by the components of the magnetics assembly to the floor portion of the magnetics assembly housing part.

13. The charging pad of claim 10 wherein:
the electronics assembly includes a printed circuit board having electric and electronic components arranged thereon and a thermal interface layer, the thermal interface layer being arranged between the printed circuit board and the ceiling portion of the electronics assembly housing part.

14. The charging pad of claim 10 wherein:
the magnetics assembly housing part is of a thermally conductive plastic.

15. The charging pad of claim 10 wherein:
the electronics assembly housing part is of at least one of thermally conductive plastic and metal.

* * * * *